United States Patent
Wang

(10) Patent No.: US 10,889,027 B2
(45) Date of Patent: Jan. 12, 2021

(54) SHAPING MOLD FOR FORMING A POROUS STARCH CONTAINER

(71) Applicant: Chen Wei Wang, Kaohsiung (TW)

(72) Inventor: Chen Wei Wang, Kaohsiung (TW)

(73) Assignee: JS GreenLife Technology Co., Ltd., New Taipei (TW)

( * ) Notice: Subject to any disclaimer, the term of this patent is extended or adjusted under 35 U.S.C. 154(b) by 0 days.

(21) Appl. No.: 16/299,163

(22) Filed: Mar. 12, 2019

(65) Prior Publication Data

US 2020/0290239 A1    Sep. 17, 2020

(51) Int. Cl.
| | | |
|---|---|---|
| *B29C 33/10* | (2006.01) | |
| *B29C 33/38* | (2006.01) | |
| *B29C 44/02* | (2006.01) | |
| *B29C 44/58* | (2006.01) | |
| *B29L 31/00* | (2006.01) | |

(52) U.S. Cl.
CPC .......... B29C 33/3814 (2013.01); B29C 33/10 (2013.01); B29C 44/02 (2013.01); B29C 44/588 (2013.01); *B29K 2003/00* (2013.01); *B29K 2905/00* (2013.01); *B29K 2909/02* (2013.01); *B29L 2031/712* (2013.01)

(58) Field of Classification Search
CPC ... B29C 33/3814; B29C 44/588; B29C 33/10; B29C 44/02; B29K 2003/00; B29K 2905/00; B29K 2909/02; B29L 2031/712
See application file for complete search history.

(56) References Cited

U.S. PATENT DOCUMENTS

| | | | | |
|---|---|---|---|---|
| 2,941,277 | A * | 6/1960 | Ganz .................. | B29C 33/3878 264/227 |
| 5,766,525 | A * | 6/1998 | Andersen ............. | B28B 11/003 264/40.1 |
| 5,804,127 | A * | 9/1998 | Takatori ................ | B29C 49/24 264/515 |
| 6,001,292 | A * | 12/1999 | Atake ............... | B29C 45/14778 264/135 |
| 2002/0047225 | A1 * | 4/2002 | Bruning .............. | B29C 44/445 264/46.4 |
| 2005/0150624 | A1 * | 7/2005 | Toh ........................ | D21B 1/00 162/218 |
| 2007/0224433 | A1 * | 9/2007 | Saitou ............... | B29C 45/14688 428/480 |
| 2010/0244312 | A1 * | 9/2010 | Mazzanti ................. | B28B 7/18 264/219 |
| 2019/0111589 | A1 * | 4/2019 | Mitsushima ........... | B29C 33/10 |

* cited by examiner

*Primary Examiner* — Nahida Sultana

(57) ABSTRACT

A shaping mold for forming a porous starch container includes a porous female mold which is breathable and is formed with a cavity; a porous male mold which is breathable; wherein the porous male mold contains a male mold plate and a protrusion; the protrusion extends from a bottom of the male mold plate; the porous male mold has at least one penetrating hole penetrating the male mold plate and the protrusion; and wherein when the porous male mold is combined to the porous female mold, a shaping space is formed between the protrusion of the porous male mold and the cavity of the porous female mold for forming a porous starch container; the shaping space is communicated to the penetrating hole. The starch material contains 50 wt %~90 wt % (weight percentage) starch; 5 wt %~25 wt % fiber enhancer; 3 wt %~30 wt % $CaCO_3$ for hardening; and may further contains 02 wt %~5 wt % foaming material.

16 Claims, 8 Drawing Sheets

SHAPING MOLD FOR FORMING A POROUS STARCH CONTAINER

FIELD OF THE INVENTION

The present invention is related to molds, and in particular to a shaping mold for forming a porous starch container.

BACKGROUND OF THE INVENTION

With reference to FIGS. 1 to 4, a mold 100' serves to solidify starch material. The mold 100' contains a male mold 20' and a female mold 10'. A shaping space is formed between the male mold 20' and the female mold 10'. The female mold 10' has a cavity 11' which is approximately at a center thereof. Generally, the cavity 11' is formed with a plurality of air guide holes 12'. The male mold 20' is formed with a protrusion 21' which has a shape approximately corresponding to the cavity 11'. In manufacturing, the starch is placed into the cavity 11', and then the protrusion 21' of the male mold 20' compress the starch so that the starch form as a starch container which is a shape like the shaping space. Then the whole mold and the starch are heated to solidify the starch to form as the porous starch container 30'.

In the prior art, the bottom of the cavity 11' or other proper positions are formed with a plurality of air guiding holes 12' to guide air for separating the male mold 20' from the female mold 10'. In manufacturing, the starch material having foaming agent will generate bubble which is necessary to be vented out, but the starch material will block the air guide holes in the mold so that air cannot vent out. Furthermore the molds have no holes which have no function of venting air. As a result, the foaming agent cannot present a well effect in foaming. Air bubbles accumulating within the mold will causes that hollow spaces are not uniformly distributed in the porous starch container and moreover, it is possible to generate explosion within the mold.

Therefore, the present invention is aimed to disclose a novel mold structure and the starch material which can prevent the defects in the prior art.

SUMMARY OF THE INVENTION

Accordingly, for improving above mentioned defects in the prior art, the object of the present invention is to provide a shaping mold for forming a porous starch container, wherein porous material is used to make the porous female mold and the porous male mold, which are especially suitable for forming starch material. Vapor in the starch material will be guided properly so that pressure within the molds is uniform and steady. The starch material is formed uniformly. At the same time, the longitudinal penetrating hole is installed in the porous male mold. No mold separation agent is necessary to coat on the inner surface of the porous starch container for mold separation. It can achieve the object of food safety.

To achieve above object, the present invention provides a A shaping mold for forming a porous starch container; comprising: a porous female mold having a plurality of small holes which communicates with each other so that the porous female mold is breathable and thus has the function of pressure release; the porous female mold being formed with a cavity; a porous male mold having a plurality of small holes which communicate with each other so that the porous male mold is breathable and thus has the function of pressure release; wherein the porous male mold contains a male mold plate and a protrusion; the protrusion extends from a bottom of the male mold plate; the porous male mold has at least one longitudinal penetrating hole penetrating the male mold plate and the protrusion; and wherein when the porous male mold is combined to the porous female mold, a shaping space is formed between the protrusion of the porous male mold and the cavity of the porous female mold for forming a porous starch container; the shaping space is communicated to the longitudinal penetrating hole so as to communicate with external space.

The present invention further comprises an enclosing mold enclosing the porous female mold and the porous male mold; and the enclosing mold including an upper mold and a lower mold; the upper mold having a hollow space at a lower side thereof which has a shape capable of tightly enclosing an outer side of the porous male mold; a lateral side of the upper mold being formed with a plurality of transversal penetrating holes; an upper side of the upper mold being formed with a vent hole which is positioned corresponding to that of the longitudinal penetrating hole; when the porous female mold separates from the porous male mold, air can vent out from the vent hole; an upper side of the lower mold is formed with a hollow space interior of which has a shape capable to tightly enclose an outer side of the porous female mold; a lateral side of the lower mold being formed with a plurality of transversal penetrating holes; in assembly, the upper mold is tightly adhered to the lower mold.

The starch material of comprises 50 wt %~90 wt % (weight percentage) starch; 5 wt %~25 wt % fiber enhancer for enhancing a structure of the starch material; and 3 wt %~30 wt % $CaCO_3$ for hardening the structure of the starch material. The starch material may further comprise 0.02 wt %~5 wt % foaming material.

DETAILED DESCRIPTION OF THE INVENTION

Figure 1:
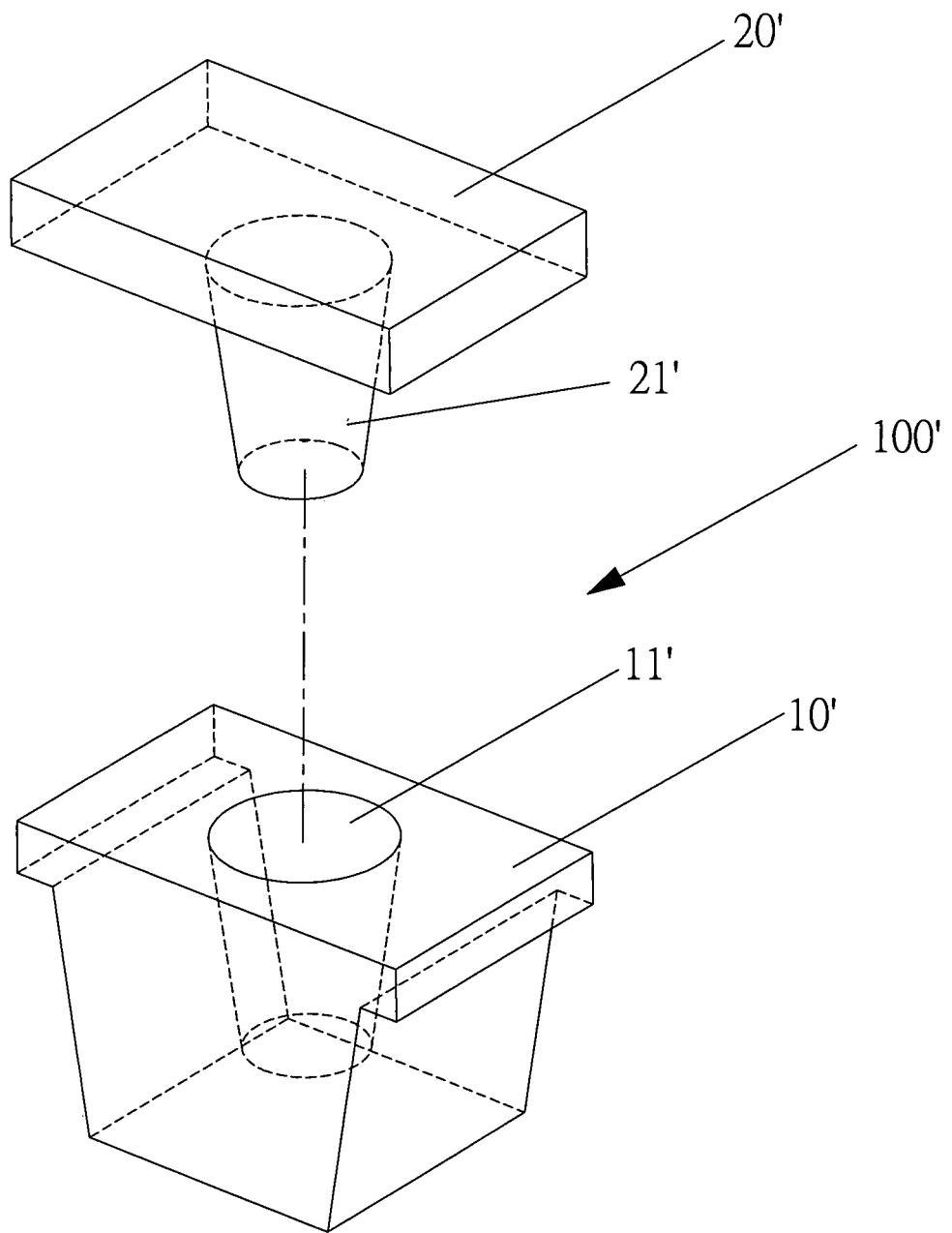
FIG. 1 shows a perspective view of a prior art mold.
Figure 2:
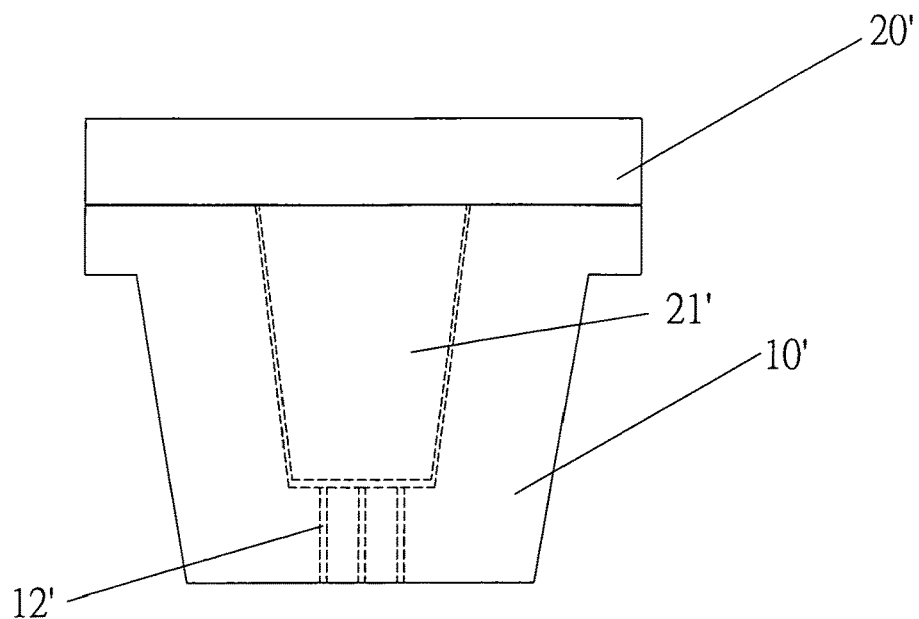
FIG. 2 is a schematic cross section view of the prior art mold structure.
Figure 3:
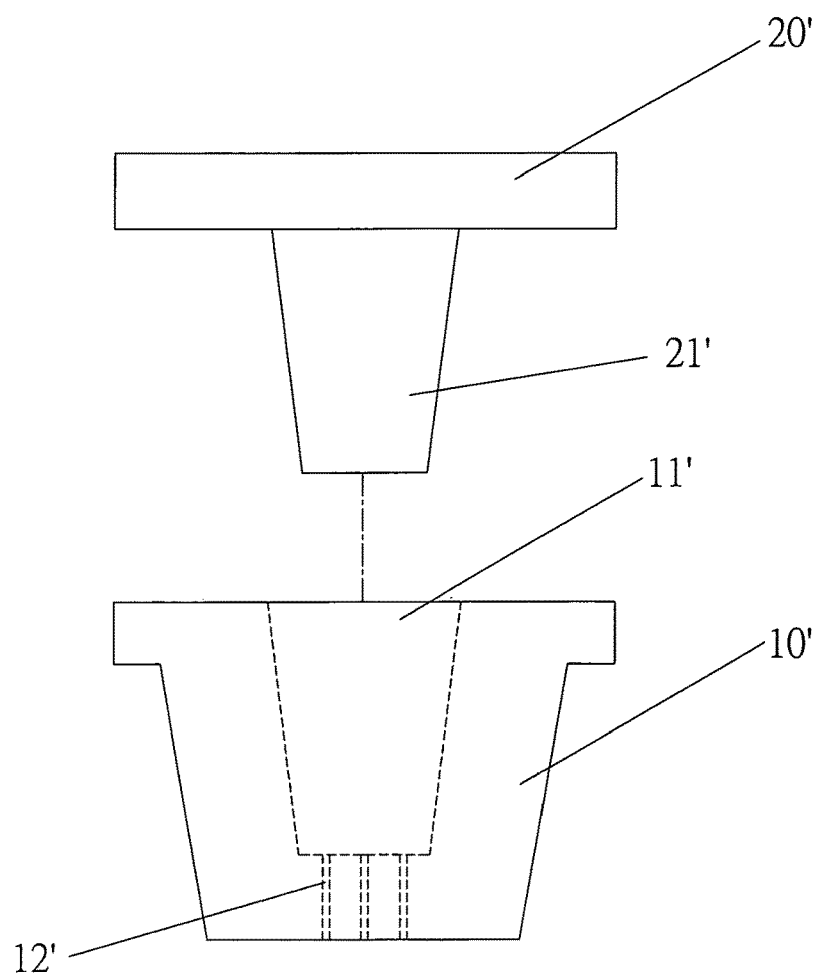
FIG. 3 is a schematic cross section view about the combination of molds in the prior art.
Figure 4:
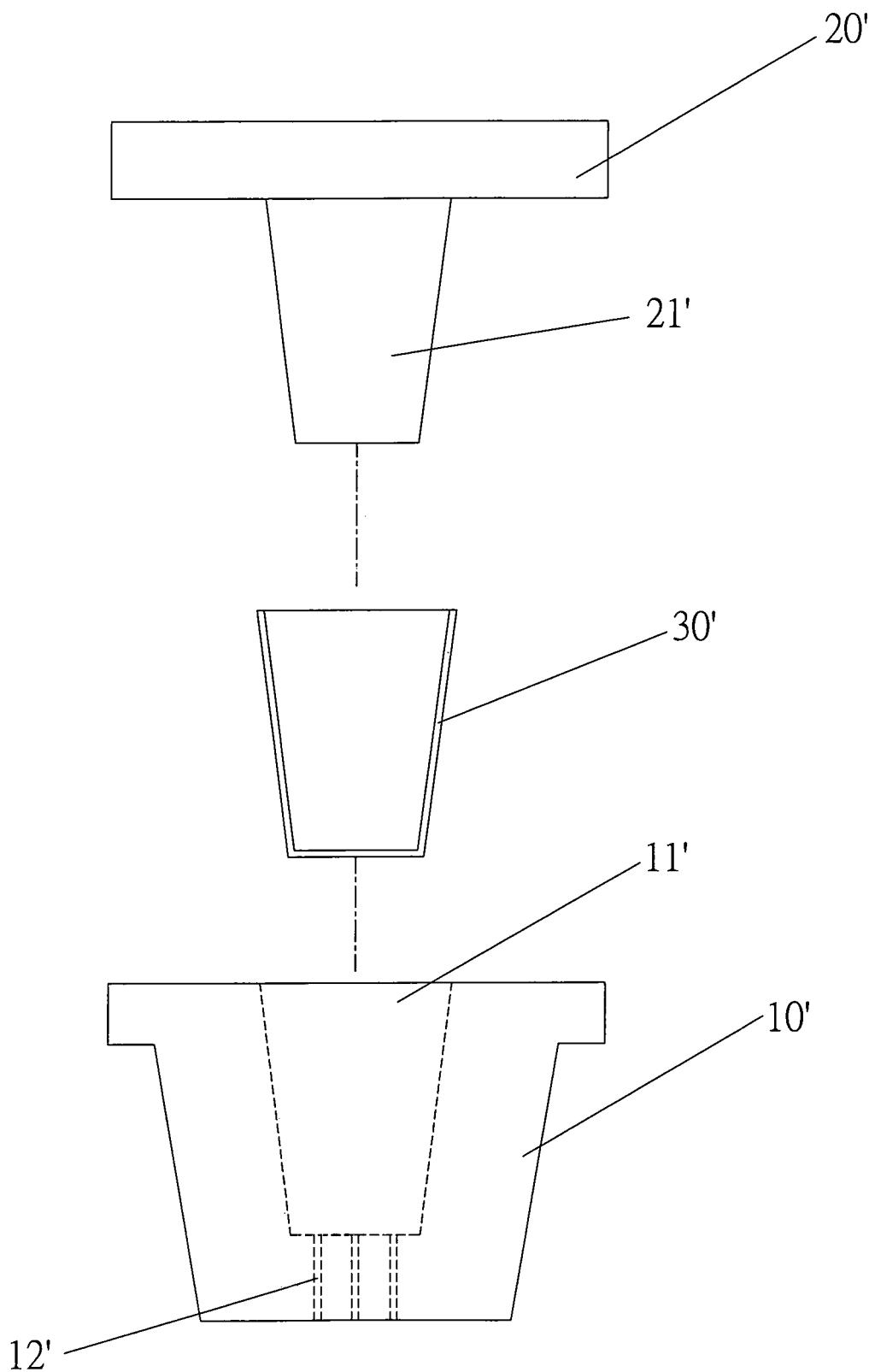
FIG. 4 is a schematic view showing that a container is taken out from a female mold in the prior art.
Figure 5:
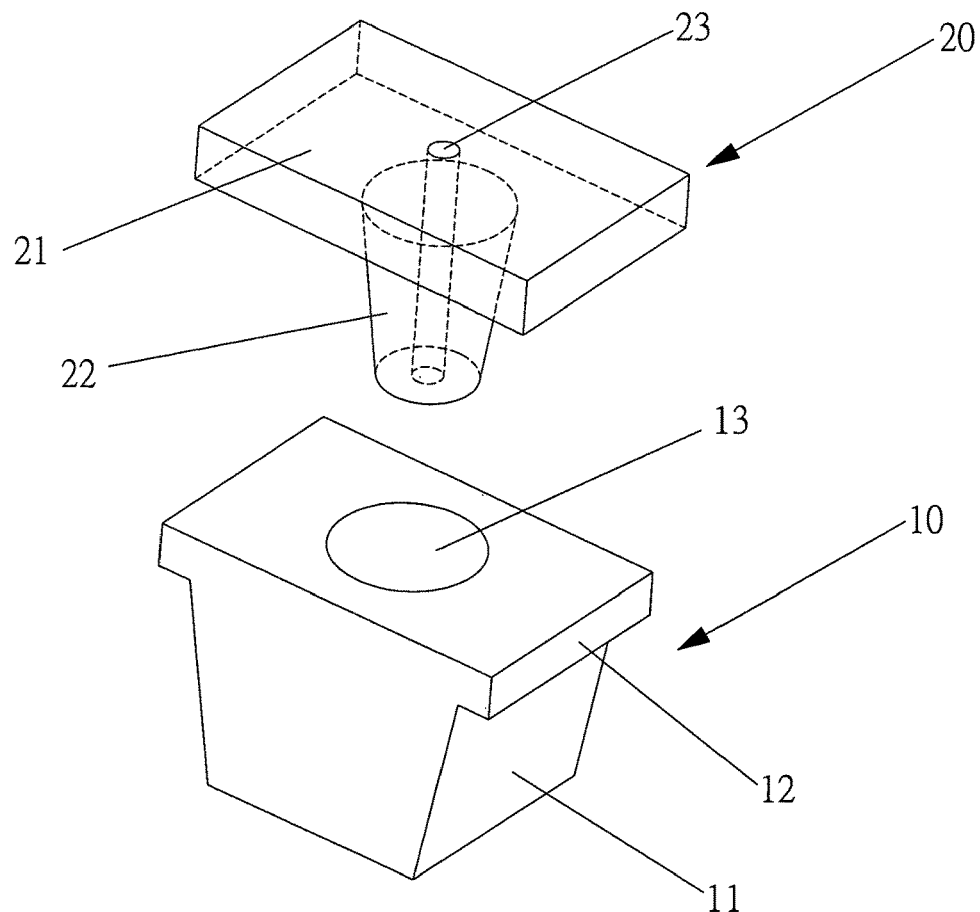
FIG. 5 is a perspective view showing the shaping mold of the porous starch container according to the present invention.
Figure 6:
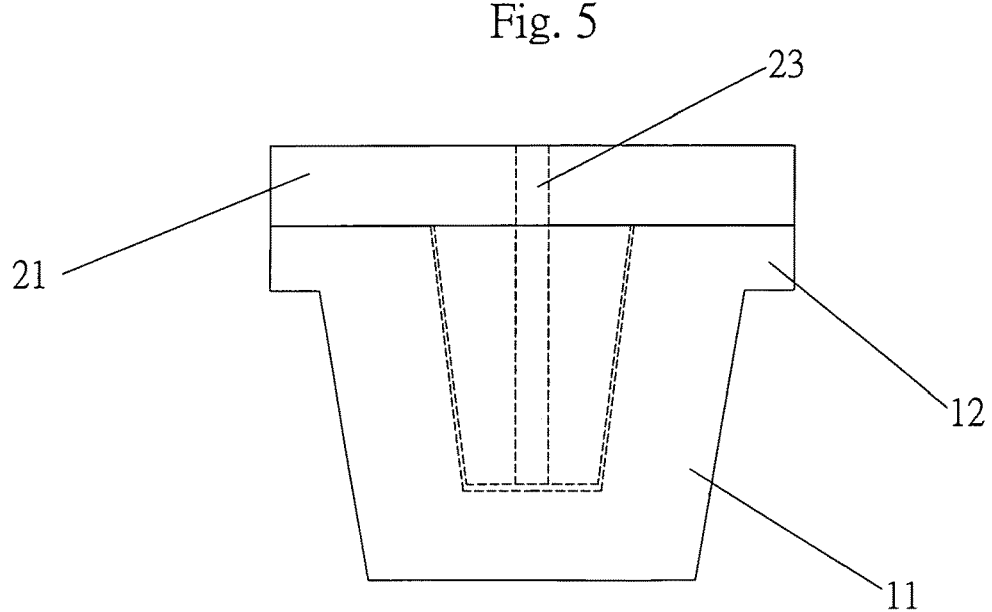
FIG. 6 is a schematic cross section view of the shaping mold of the porous starch container according to the present invention.

In order that those skilled in the art can further understand the present invention, a description will be provided in the following ill details. However, these descriptions and the appended drawings are only used to cause those skilled in the art to understand the objects, features, and characteristics of the present invention, but not to be used to confine the scope and spirit of the present invention defined in the appended claims.

With reference to FIGS. 5 to 11, the porous starch container 30 of the present invention is illustrated. The present invention comprises the following elements:

A porous female mold 10 is made of materials, such as metal, high molecular material or ceramic materials, etc. The porous female mold 10 have a plurality of small holes which communicate with each other so that the porous female mold 10 is breathable and thus has the function of pressure release. Preferably, the diameter of the hole in the porous female mold 10 is equal to or smaller than 0.2 mm.

The porous female mold 10 contains a mold body 11 and a female mold plate 12 which is formed at an upper side of the mold body 11. The porous female mold 10 is formed with a cavity 13 which penetrates through the female mold plate 12 and the cavity 13.

The porous male mold 20 is made of materials, such as metal, high molecular material or ceramic materials, etc. The porous male mold 20 has a plurality of small holes which communicate with each other so that the porous male mold 20 is breathable and thus has the function of pressure release. Preferably, the diameter of the hole in the porous male mold 20 is equal to or smaller than 0.2 mm.

The porous male mold 20 contains a male mold plate 21 and a protrusion 22. The protrusion 22 extends from a bottom of the male mold plate 21. The male mold plate 21 and the protrusion 22 may be formed integrally. The porous male mold 20 has at least one longitudinal penetrating hole 23 penetrating the male mold plate 21 and the protrusion 22. Preferably, the size of the mate mold plate 21 is corresponding to that of the female mold plate 12.

Figure 7:
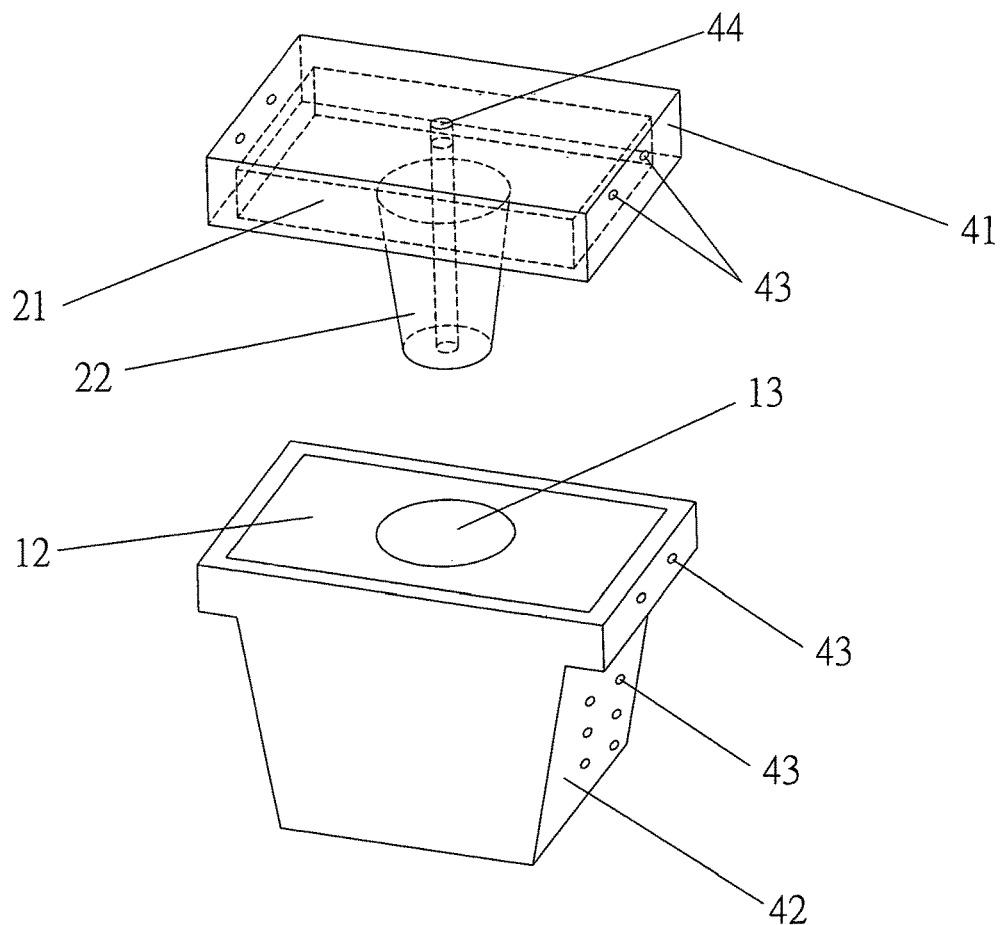
FIG. 7 shows an enclosing mold according to the present invention which encloses a porous female mold and a porous male mold according to the present invention.
Figure 8:
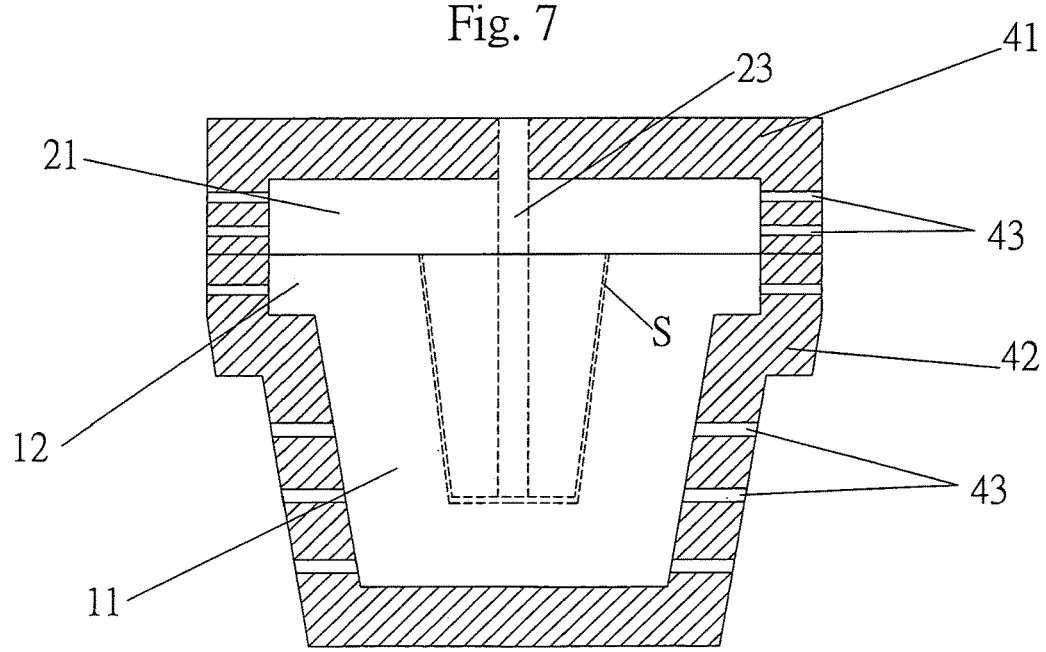
FIG. 8 is a cross section view of FIG. 7.
Figure 9:
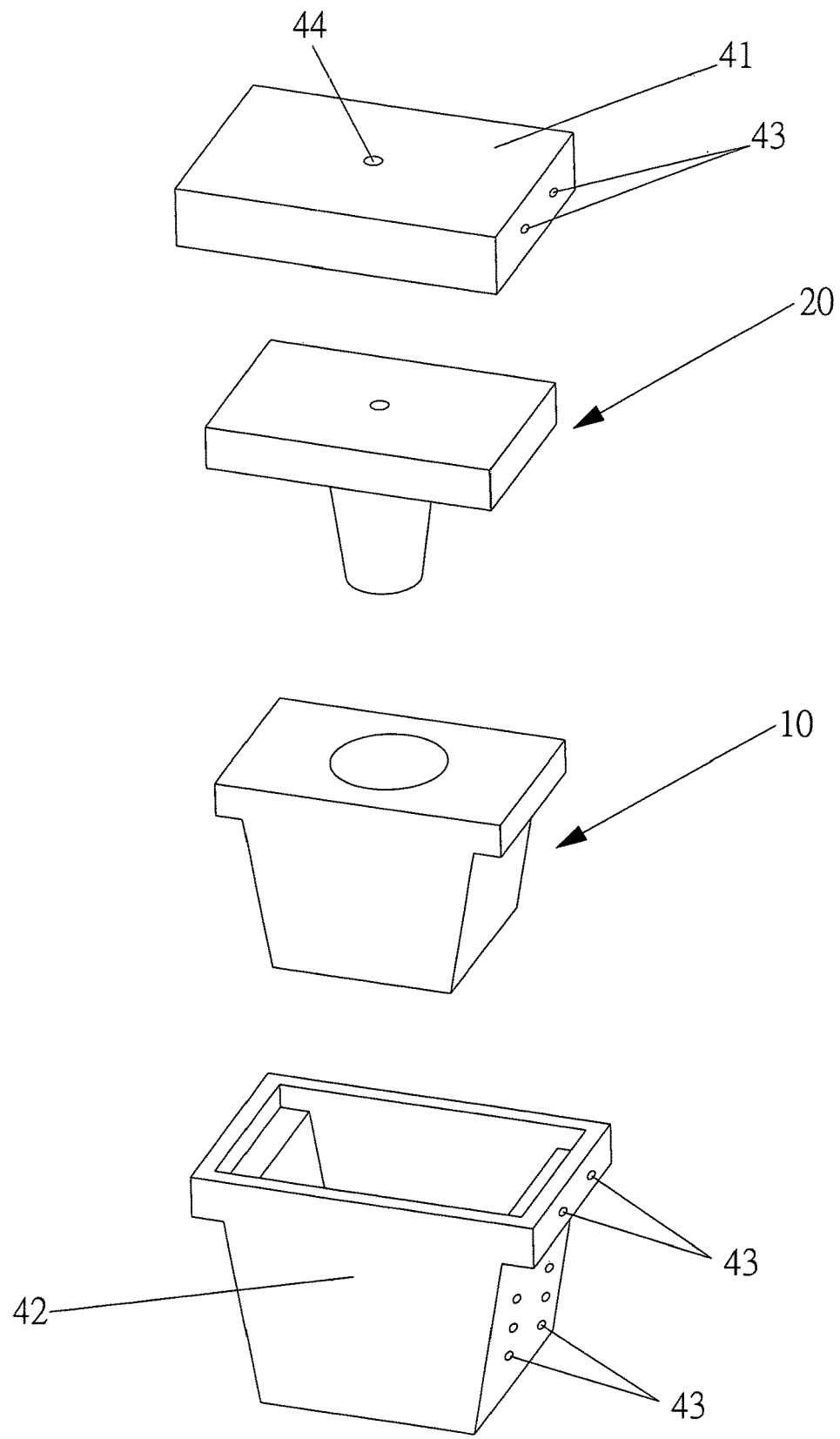
FIG. 9 is an exploded view of the enclosing mold, porous female mold and porous male mold according to the present invention.

Preferably, as shown in FIGS. 7 to 9, the present invention further includes an enclosing mold enclosing the porous male mold 20 and the porous female mold 10 for enhancing the strength of the whole structure so as to prevent deformation in heating and retain the property of the material. The enclosing mold is formed with a plurality of transversal penetrating holes 43.

The enclosing mold includes an upper mold 41 and a lower mold 42. The upper mold 41 has a hollow space at a lower side thereof which has a shape capable of tightly enclosing an outer side of the porous male mold 20. A lateral side of the upper mold 41 is formed with a plurality of transversal penetrating holes 43 so that in heating, air can flow out from these transversal penetrating holes 43. An upper side of the upper mold 41 is formed with a vent hole 44 which is positioned corresponding to that of the longitudinal penetrating hole 23. When the porous male mold 20 separates from the porous female mold 10, air can vent from the vent hole 44. An upper side of the lower mold 42 is formed with a hollow space interior of which has a shape capable to tightly enclosing an outer side of the porous female mold 10. A lateral side of the lower mold 42 is formed with a plurality of transversal penetrating holes 43 so that in heating, air can flow out from these transversal penetrating holes 43. In assembly, the upper mold 41 is tightly adhered to the lower mold 42.

When the porous female mold 10 is assembled to the porous male mold 20, the protrusion 22 is positioned within the cavity, but does not contact the cavity 13 so that a shaping space S is formed for forming a porous starch container 30. The shape space S is communicated to the longitudinal penetrating hole 23 of the porous male mold 20. There may be a plurality of longitudinal penetrating holes 23 to be communicated to the shaping space S.

Figure 10:
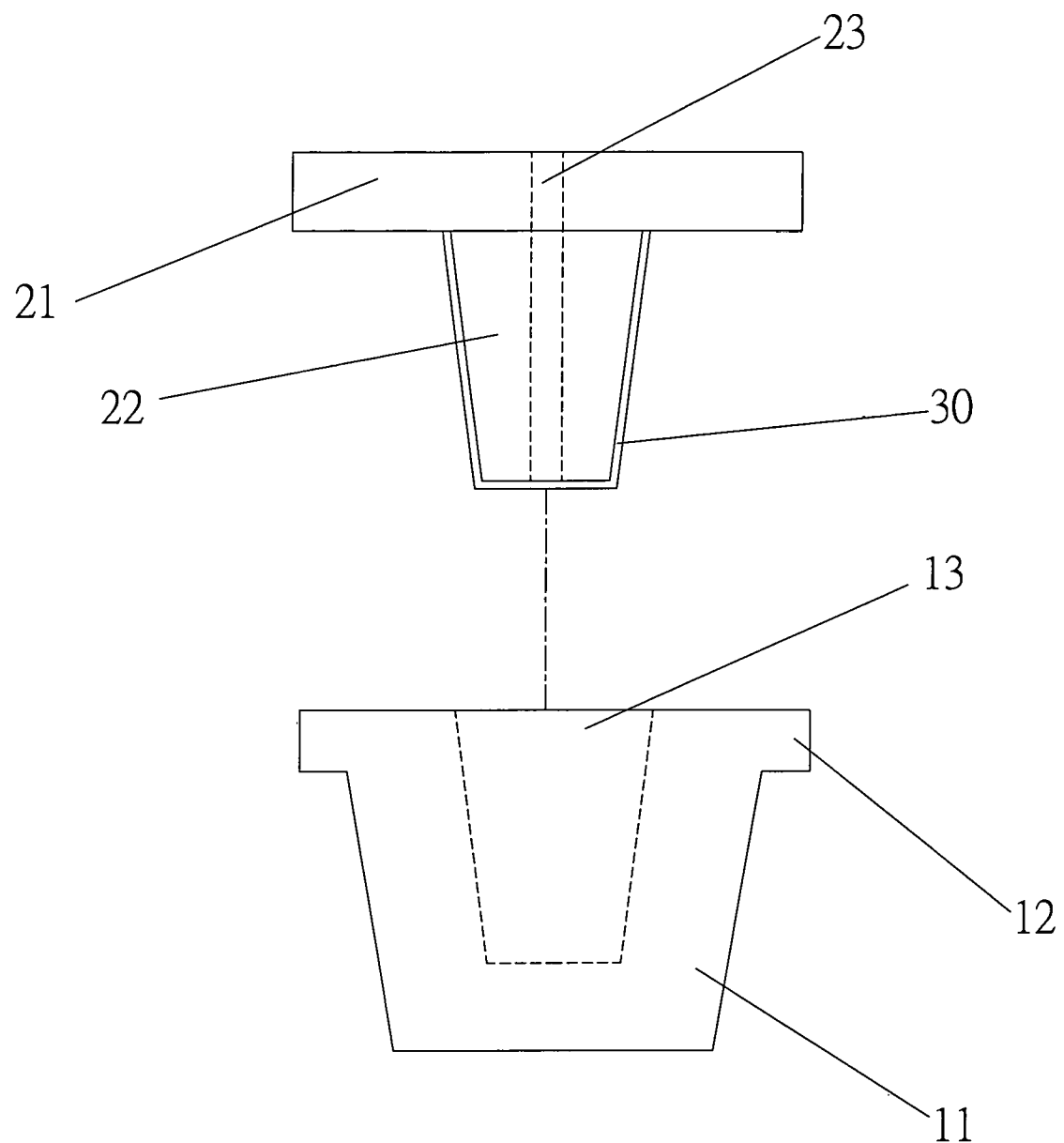
FIG. 10 is a schematic view showing that the porous starch container is adhered to a protrusion.
Figure 11:
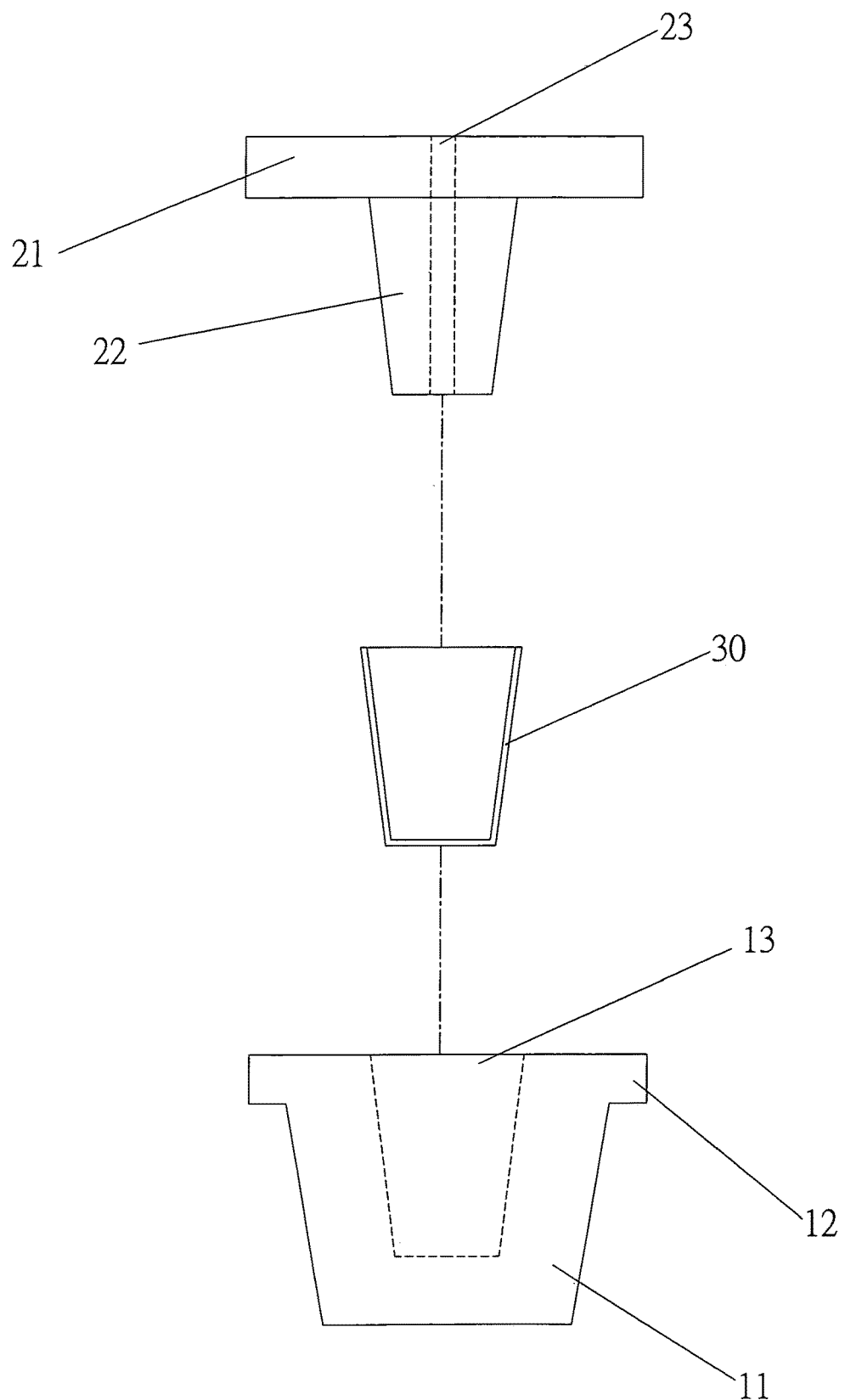
FIG. 11 is a schematic view showing the porous starch container is taken down from the porous male mold.

FIG. 10 is a schematic view showing that when the porous male mold 20 is separated from the porous female mold 10, the porous starch container 30 is adhered to the protrusion 22. FIG. 12 is a schematic view showing that in the present invention, the porous starch container 30 is taken down from the porous male mold 20.

The porous starch container 30 is mainly formed by starch material. In manufacturing, the starch material is firstly placed in the cavity 13 of the porous female mold 10. The volume of the starch material is approximately equal to that of the shaping space S. When the porous male mold 20 is combined with the porous female mold 10, the protrusion 22 is exactly positioned within the cavity 13. At this time, the starch material is compressed by the protrusion 22 to form with a shape like the shaping space S. Then the porous male mold 20 and porous female mold 10 are heated so that the starch material is foamed to form as the porous starch container 30.

The starch material of the present invention mainly comprises 50 wt %~90 wt % (weight percentage) starch; 5 wt %~25 wt % fiber enhancer (preferably, it is plant fiber or pulp fiber) for enhancing the structure of the starch material; 3 wt %~30 wt % CaCO3 for hardening the structure of the starch material; preferably, 0.02 wt %~5 wt % foaming material is added thereto, the foaming material is selected from yeast or generally used chemical foaming material. After forming, 40%~60% of the volume of the porous starch container 30 is hollowed. The object of foaming is to increase the heat resistance, and reduce the weight and material in manufacturing so as to reduce the cost. Preferably, the environment of forming the starch material is high humidity environment (the humidity is about 80%). The starch material is formed as blocks so as to mix with water. To cause water to be uniformly distributed in the starch material, the starch material is rubbed many times until the hardness of the surface of the starch material is between 10 HA~20 HA.

The starch of the starch material is selected from potato starch, corn starch, wood starch, or other plant starch. Because the particles of these starches are not preferred so that water is necessary for concreting the structure of the starch material. When the starch material is placed in the shaping space S and then compressed and heated to a temperature of about 100° C., water therein will evaporate to be formed with a plurality of holes in the porous starch container 30. Then the water is used as a foaming agent to expand the volume of the porous starch container. The evaporated water will vent out from the holes of the porous male mold 20 and the porous female mold 10 so as to retain the pressure within the mold. Another, the starch material may foam uniformly.

In the foaming process, to avoid the starch material to block the longitudinal penetrating hole 23, the porous male mold 20 and the porous female mold 10 are preheated in advance. When the two molds are combined, the temperature on the surface of the molds will become higher due to preheat (about 195° C.). Therefore, when the starch material contacts the surface of the molds, the protrusion 22 will compress the starch material so as to reduce the probability of blocking the longitudinal penetrating hole 23.

When the porous starch container 30 is taken out, the porous male mold 20 is separated from the porous female mold 10, and then the longitudinal penetrating hole 23 can guide exterior air A into the mold so that the porous starch container 30 is pressed by the air A to drop out from the protrusion 22. Because the porous starch container 30 is generally used to receive foods, and thus the inner surface thereof is not suitable to be coated with a layer of mold separation agent. Therefore, the present invention uses air A to have the function of mold separation of the porous starch container 30. While the outer surface of the porous starch container 30 may be coated with a layer of mold separation agent. When the porous male mold 20 is separated from the porous female mold 10, the porous starch container 30 will adhere to the protrusion 22.

In another embodiment, if it does not desire to coat mold separation agent on the outer surface of the cavity 13, an outer surface of the protrusion 22 may be formed as a coarse surface or formed with a plurality of trenches or convex objects so as to increase the friction between the porous starch container 30 and the protrusion 22. When the two molds are separated, the porous starch container 30 will adhere on the surface of the protrusion 22. When air A is guided into the longitudinal penetrating hole 23, the porous starch container 30 is separated from the protrusion 22. No mold separation agent is necessary.

Advantages of the present invention are that the porous material, is used to make the porous male mold 20 and the porous female mold 10, which are especially suitable for forming starch material. Vapor in the starch material will be guided properly so that pressure within the molds is uniform and steady. The starch material is formed uniformly. At the same time, the longitudinal penetrating hole 23 is installed in the porous male mold 20. No mold separation agent is necessary to coat on the inner surface of the porous starch container 30 for mold separation. It can achieve the object of food safety.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A shaping mold for forming a porous starch container, comprising:
    a porous female mold having a plurality of small holes which communicates with each other so that the porous female mold is breathable and thus has the function of pressure release; the porous female mold being formed with a cavity;
    a porous male mold having a plurality of small holes which communicate with each other so that the porous male mold is breathable and thus has the function of pressure release; wherein the porous male mold contains a male mold plate and a protrusion; the protrusion extends from a bottom of the male mold plate; the porous male mold has at least one longitudinal penetrating hole penetrating the male mold plate and the protrusion; and
    wherein when the porous male mold is combined to the porous female mold, a shaping space is formed between the protrusion of the porous male mold and the cavity of the porous female mold for forming a porous starch container; the shaping space is communicated to the longitudinal penetrating hole so as to communicate with external space;
    an enclosing mold enclosing the porous female mold and the porous male mold; and
    the enclosing mold including an upper mold and a lower mold; the upper mold having a hollow space at a lower side thereof which has a shape capable of tightly enclosing an outer side of the porous male mold; a lateral side of the upper mold being formed with a plurality of transversal penetrating holes; an upper side of the upper mold being formed with a vent hole which is positioned corresponding to that of the longitudinal penetrating hole; when the porous female mold separates from the porous male mold, air can vent out from the vent hole; an upper side of the lower mold is formed with a hollow space interior of which has a shape capable to tightly enclose an outer side of the porous female mold; a lateral side of the lower mold being formed with a plurality of transversal penetrating, holes; in assembly, the upper mold is tightly adhered to the lower mold.

2. The shaping mold for forming a porous starch container as claimed in claim 1, wherein a surface of the protrusion is formed with a plurality of trenches.

3. The shaping mold for forming a porous starch container as claimed in claim 1, wherein a surface of the protrusion is formed as a coarse surface.

4. The shaping mold for forming a porous starch container as claimed in claim 1, wherein the porous female mold contains a mold body and a female mold plate which is formed at an upper side of the mold body; the porous female mold is formed with the cavity which penetrates through the female mold plate and the cavity.

5. The shaping mold for forming a porous starch container as claimed in claim 4, wherein the female mold plate and the mold body are formed integrally.

6. The shaping mold for forming a porous starch container as claimed in claim 1, wherein the male mold plate and the protrusion are integrally formed.

7. The shaping mold for forming a porous starch container as claimed in claim 1, wherein materials of the porous female mold and the porous male mold are selected from porous metals and ceramic materials.

8. The shaping mold for forming a porous starch container as claimed in claim 1, wherein in manufacturing, the starch material is firstly placed in the cavity of the porous female mold; the volume of the starch material is approximately equal to that of the shaping space; when the porous female mold is combined with the porous male mold, the protrusion is exactly positioned within the cavity; at this time, the starch material is compressed by the protrusion to form with a shape like the shaping space; then the porous female mold and porous male mold are heated so that the starch material is foamed to form as the porous starch container.

9. The shaping mold for forming a porous starch container as claimed in claim 8, wherein a hardness of the starch material is within 10 HA to 20 HA (Shao' hardness A), and before filling the starch material, the porous female mold and the porous male mold are preheated to a temperature higher than 200° C.

10. The shaping mold for forming a porous starch container as claimed in claim 1, wherein the starch material of comprises
    50 wt %~90 wt % (weight percentage) starch;
    5 wt %~25 wt % fiber enhancer for enhancing a structure of the starch material; and
    3 wt %~30 wt % $CaCO_3$ for hardening the structure of the starch material.

11. The shaping mold for forming a porous starch container as claimed in claim 10, wherein the fiber enhancer is selected from plant fibers and pulp fibers.

12. The shaping mold for forming a porous starch container as claimed in claim 10, wherein the starch material further comprises 0.02 wt %~5 wt % foaming material.

13. The shaping mold for forming a porous starch container as claimed in claim 12, wherein the foaming material is selected from yeast and generally used chemical foaming material; and after forming, 40%~60% of a volume of the porous starch container is hollowed.

14. The shaping mold for forming a porous starch container as claimed in claim 1, wherein, an environment of forming the starch material is high humidity environment with a humidity higher than 80% (wt); the starch material is formed as blocks so as to mix with water; to cause water to be uniformly distributed in the starch material, the starch material is rubbed until the hardness of the surface of the starch material is between 10 HA~20 HA.

15. The shaping mold for forming a porous starch container as claimed in claim 10, wherein starch of the starch material is selected from potato starch, corn starch, wood starch, and other plant starch.

16. The shaping mold for forming a porous starch container as claimed in claim 1, wherein when the starch material is placed in the shaping space, the starch is compressed and heated to a temperature of about 100° C., water therein evaporates to be formed with a plurality of holes in the porous starch container; then the water is functioned as foaming agent to expand the volume of the porous starch container; the evaporated water vents out from the holes of the porous female mold and the porous male mold so as to retain the pressure within the mold; another, the starch material foams uniformly.

\* \* \* \* \*